May 20, 1947.                L. J. IRRGANG                2,420,826
            STRAIN RELIEF FOR ELECTRICAL CONDUCTORS
                       Filed March 24, 1944

INVENTOR.
LOUIS J. IRRGANG
BY
A. D. F. Libby
Attorney

Patented May 20, 1947

2,420,826

UNITED STATES PATENT OFFICE 2,420,826

STRAIN RELIEF FOR ELECTRICAL CONDUCTORS

Louis J. Irrgang, Jersey City, N. J.

Application March 24, 1944, Serial No. 527,949

4 Claims. (Cl. 174—153)

This invention relates to strain-relief means for electrical conductors which pass through some sort of support such as a plate usually found in radio-receiving sets. Of course, it is to be understood that it is not limited to this particular use.

In the past, where an electrical cord or cable is passed through such a support plate or the equivalent thereof, it has been the practice to use a soft rubber bushing or grommet to protect the cord from being cut by the orifice in the support plate, but such bushings do not provide the proper strain relief for the cord or cable, and almost no relief whatever from twisting or torque strains.

It is the principal object of my present improvement to provide a bushing or strain-relief means which is easily installed on the cord or cable, and one that is easily moved into position in the support plate.

Another object is to provide a strain-relief device which will eliminate all twisting torque strain from the cord or cable.

A further object is to provide a strain-relief device which aids in insulating the cord or cable from the support member, especially where the support member is of metal.

Another object of my invention is to provide a strain-relief insulator of a character which will add to the insulating characteristics of the cord or cable with respect to the support plate.

My improved type of strain-relief device is illustrated in the annexed drawing wherein the different views on the drawing as filed in the Patent Office are substantially twice the size of the devices that I have made.

Figure 1:
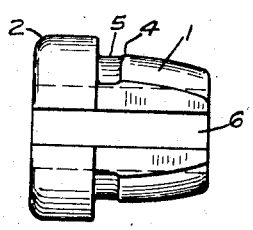
Figure 1 is a plan view of the structure looking at the longitudinal split through the device.

In the various views, wherein like numbers refer to corresponding parts, 1 is a strain-relief device preferably made of good insulating material such as rubber vulcanized to give it the desired degree of hardness. The strain-relief device has a collar 2 somewhat larger in diameter than the body portion 1 and sufficient to cover the opening or orifice in the mounting plate 3. As will be noticed from Figure 1, the body portion 1 is somewhat tapered to provide easy assembly with the plate 3. Between the end of the taper 4 and the collar 2, there is a slight annular recess 5, the purpose of which will be presently explained.

Figure 2:
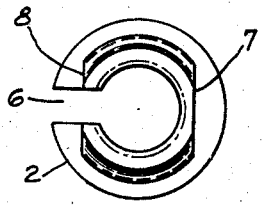
Figure 2 is a view of Figure 1, looking from right to left.
Figure 3:
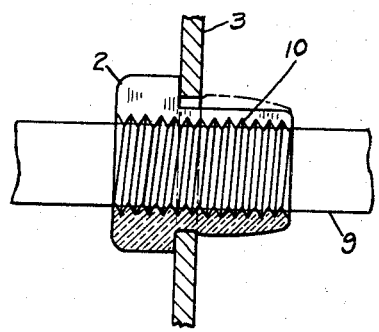
Figure 3 is a part-sectional and part-elevational view of the device installed on a cord or cable and mounted in the support plate.
Figure 6:
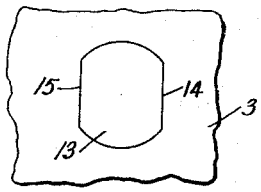
Figure 6 is a portion of a mounting plate showing a hole therein for receiving one form of the structure.

The strain-relief device has a longitudinal split 6 extending throughout its length and is provided with at least one flat surface 7 to engage a corresponding surface 14 in the orifice 13 of the mounting plate 3. As shown in Figure 2, the device has an additional flat 8, and when provided with two flats, the orifice 13 in the mounting plate 3 is of course made accordingly with a surface 15, so that when the strain-relief device is pushed into the plate hole 13 as shown in Figure 6, after it has been mounted on a cord or cable 9, it is securely held from turning so that all torque strain is removed from the cord or cable.

When the device is pushed into the plate 3, the structure, by reason of the split 6, is forced by the plate into strong gripping relation with the conductor 9, and the diameter of the recess 5 being but slightly smaller than the diameter of the tapered portion of the device at the point 4, the grip is retained on the cable 9. To enhance this gripping action, the structure may be provided with a plurality of ridges 10, preferably in the form of screw-type threads, which, due to the pressure applied to the device by the plate 3, are caused to force the insulation of the cord or cable into the grooves of the thread. Since the structure is preferably made of insulating material, the insulating characteristics of the cable with respect to the plate 3 are not damaged, but improved. When the device is made of metal, it is preferable to use an asbestos tape around the conductor 9.

Figure 4:
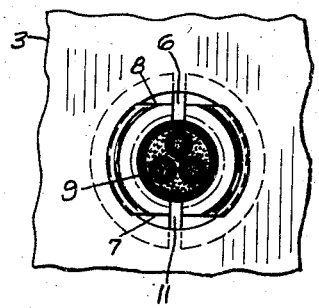
Figure 4 is a view of a slightly modified form of the structure shown in Figure 3, looking from right to left.

In the form shown in Figure 4, the device may be in two parts as illustrated by the splits 6 and 11. This means that if the structure of Figure 1, with the one split, should happen to be made out of hard rubber vulcanized too hard, and during the installation it cracks on the side opposite from the split, no harm would be done as the cable 9 would be securely gripped and held from push-pull, as well as torque strains.

Figure 5:
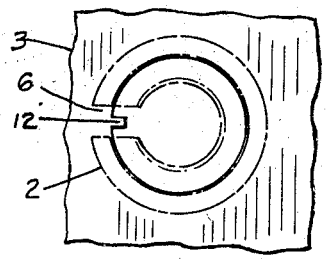
Figure 5 is a view of the device of Figure 1 installed in place, looking from right to left, with a modified form of structure to take up the torque strain.

In Figure 5, the construction of the device is the same as shown in Figure 1, but the plate 3 has a lug 12 forced inwardly into that part of the split 6 positioned within the collar 2. In this case, the lug 12 is much narrower than the width of the split 6 so as not to interfere with the compression of the structure around the cord when it is forced into position in the support plate 3.

As heretofore referred to, the device is slipped onto the cord or cable and then the cable passed through the orifice in the support plate and the conductors of the cord or cable attached to their respective terminals of the structure to which attachment is to be made. Then the cord may be pulled back to take up all the slack, and the strain-relief device then slid along the cord into the orifice in the mounting plate as heretofore described.

Thus the structure eliminates all cord waste since no loop is required as in many other forms of bushings or grommets.

What I claim is:

1. Strain-relief means for an electrical cord or cable comprising, in combination with a support plate having an opening therein, the wall of which will compressibly receive said means, and defined by at least one straight side, a split tapered member of substantially non-compressible insulating material adapted to be slipped onto the cord or cable and to normally fit snugly thereover and having a collar adjacent to but of larger diameter than the large end of the taper, with a slight recess between the collar and the tapered portion, the split being wide enough to allow substantial contraction of the member, while the recess has a diameter such that when the tapered end of the member is forced into said plate opening, so the plate is positioned in the recess, the wall of said opening in the plate forces the member to grip the cord or cable, the member having at least one flat face to cooperate with the straight side of the opening to prevent the member from turning in the plate.

2. Strain-relief means for an electrical cord or cable comprising, in combination with a support plate having an opening therein, the wall of which will compressibly receive said means, a split tapered member of substantially non-compressible insulating material adapted to be slipped onto the cord or cable and to normally fit snugly thereover and having a collar adjacent to but of larger diameter than the large end of the taper, with a slight recess between the collar and the tapered portion, the split being wide enough to allow substantial contraction of the member, while the recess has a diameter such that when the tapered end of the member is forced into said plate opening, so the plate is positioned in the recess, the wall of said opening in the plate forces the member to grip the cord or cable and forming the only gripping action on the cord or cable, the plate having a finger projecting from the wall of the opening into the split to prevent turning of the member in the plate, the finger being much narrower than the width of the split so as not to interfere with the contraction of the member.

3. Strain-relief means for an electrical cord or cable comprising, in combination with the support plate having an opening therein, the wall of which will compressibly receive said means, and an electrical cord or cable, a single horizontally uniformly split insulating means adapted to be slid on the cord or cable and to normally fit snugly thereover and adapted to be moved into said opening, said means being substantially non-compressible but adapted to have oppositely disposed portions sufficiently spaced and arcuately forced into gripping relation with the cord or cable by the plate and forming at all times the only gripping action on the cord or cable after said means are inserted to fully operative position in the plate opening, means for holding the first-mentioned means in said operative position, and further means for preventing the first-mentioned means from turning in the plate.

4. Strain-relief means for an electrical cord or cable comprising, in combination with a support plate having an opening therein, the wall of which will compressibly receive said means, and a cord or cable, insulating means of substantially non-compressible insulating material for supporting the cord or cable in the opening, said insulating means having one split to its interior longitudinal of its length and of sufficient width whereby the inner surface of the parts forming the split are forced into and held in gripping relation with the cord or cable by the walls of the opening and forming at all times the only gripping action on the cord or cable after the insulating means is moved over the cord or cable into gripping position in the opening, the insulating means having portions larger in diameter than the opening for engaging the face of the plate, and also having a slight recess to receive the walls of the opening, and means for preventing said insulating means from turning in the opening.

LOUIS J. IRRGANG.

REFERENCES CITED

The following references are of record in the file of this patent:

UNITED STATES PATENTS

| Number | Name | Date |
| --- | --- | --- |
| 2,225,472 | Franklin | Dec. 17, 1940 |
| 2,291,430 | Ingersoll | July 28, 1942 |
| 2,348,649 | Richards | May 9, 1944 |
| 1,094,990 | Havens, Jr. | Apr. 28, 1914 |
| 475,783 | Manger et al. | May 31, 1892 |
| 817,346 | Stakelbeck | Apr. 10, 1906 |
| 1,809,864 | Pearson | June 16, 1931 |
| 1,586,348 | Allen | May 25, 1926 |
| 2,277,637 | Eby | Mar. 24, 1942 |
| 2,145,744 | Whitney | Jan. 31, 1939 |
| 1,218,216 | Schmid, Jr. | Mar. 6, 1917 |
| 1,527,023 | Bowden | Feb. 17, 1925 |